(12) United States Patent
Hosaka (10) Patent No.: US 6,381,414 B2
(45) Date of Patent: Apr. 30, 2002

(54) OSCILLATION CIRCUIT AND STROBE DEVICE EMPLOYING THE OSCILLATION CIRCUIT

(75) Inventor: Takao Hosaka, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/749,048

(22) Filed: Dec. 27, 2000

(30) Foreign Application Priority Data

Dec. 28, 1999 (JP) .......................................... 11-372243

(51) Int. Cl.[7] ........................ G03B 17/02; G03B 15/05; G03B 7/26
(52) U.S. Cl. ............................ 396/156; 396/6; 396/206
(58) Field of Search .......................... 396/6, 156, 205, 396/206; 315/241 P, 241 R (56) References Cited

U.S. PATENT DOCUMENTS 5,966,552 A * 10/1999 Hata ........................... 396/206
6,198,881 B1 * 3/2001 Carducci et al. ................ 396/6

* cited by examiner

Primary Examiner—David M. Gray
Assistant Examiner—Rochelle Blackman
(74) Attorney, Agent, or Firm—Cantor Colburn LLP

(57) ABSTRACT

A lens-fitted film unit incorporating a strobe device, comprises: a main body; a photographic film loaded in advance in said main body; a shutter; a photographic lens; and a strobe circuit included in said strobe device, said strobe circuit comprising, a boosting-up circuit including a DC power source, an oscillation transistor, an oscillation transformer having a primary winding and a secondary winding, and a rectifying element for rectifying an electronic current induced by said oscillation transformer, an oscillation controlling circuit for controlling a base potential of said oscillation transistor, and a strobe lighting circuit including a main-capacitor charged by said electronic current rectified by said rectifying element, and a strobe-lighting tube driven by an electronic charge charged in said main-capacitor, wherein a collector and an emitter of said oscillation transistor are serially coupled between said DC power source and said primary winding of said oscillation transformer, and a base of said oscillation transistor is driven by a voltage induced by said secondary winding of said oscillation transformer, and said oscillation controlling circuit is coupled between said DC power source and said base of said oscillation transistor.

19 Claims, 8 Drawing Sheets

OSCILLATION CIRCUIT AND STROBE DEVICE EMPLOYING THE OSCILLATION CIRCUIT

BACKGROUND OF THE INVENTION

The present invention relates to an oscillation circuit and a strobe circuit, which employs the oscillation circuit, and which is suitably incorporated into lens-fitted film units.

Conventionally, some of the lens-fitted film units, in each of which a non-exposed film is incorporated in advance of putting them on the market, also incorporate a strobe device, which emits a strobe light from a light emitting tube, such as a xenon lamp, etc., by means of charging/discharging actions of a capacitor when capturing an image.

In the abovementioned lens-fitted film unit incorporating strobe device, a light-emitting action of an indicating lamp, such as a light emitting diode, a neon tube, etc., notifies the user of the completion of the discharging action of the capacitor.

An example of the conventional strobe circuits incorporated in the abovementioned lens-fitted film units will be detailed in the following, referring to FIG. 11.

Figure 11:
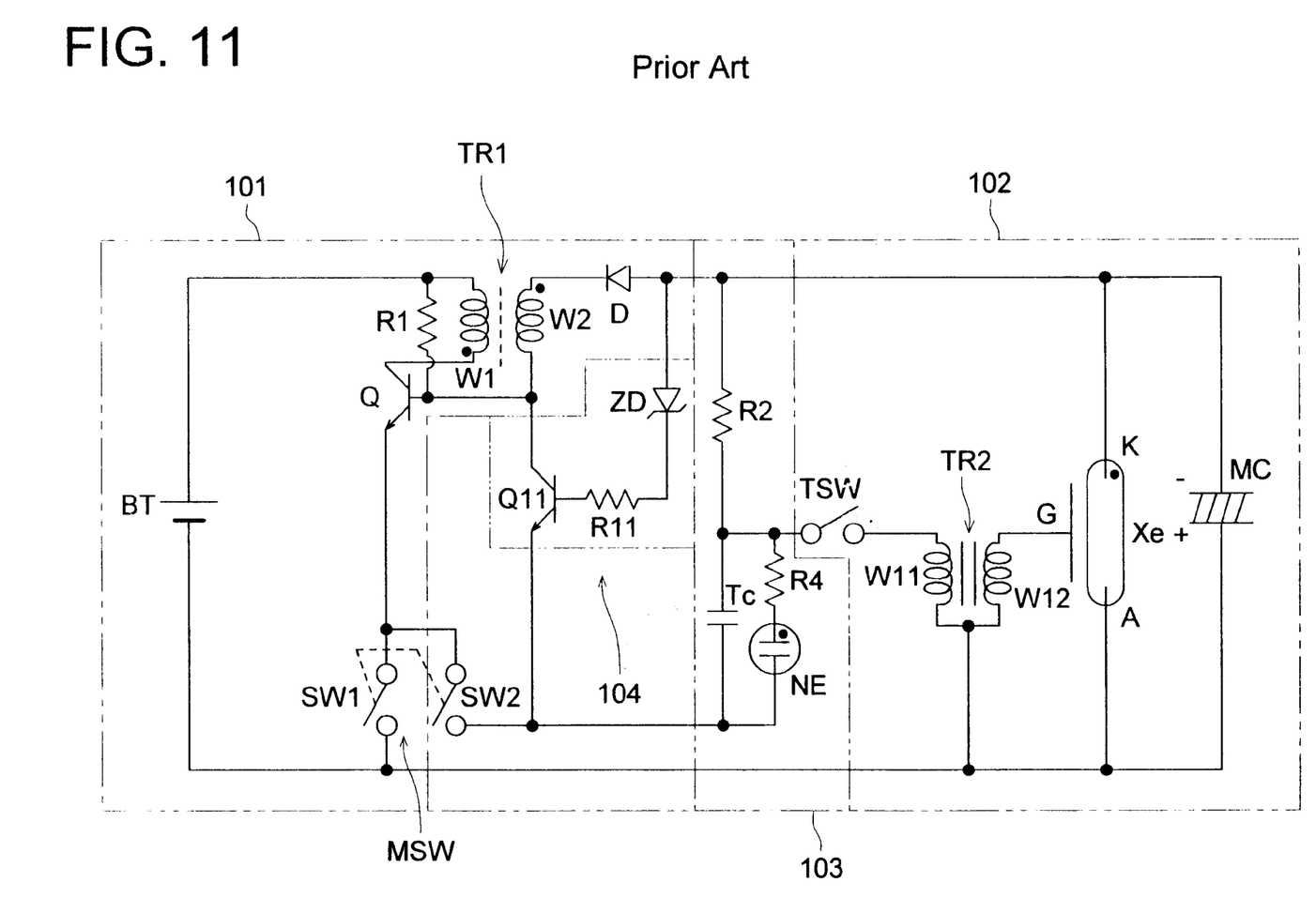
FIG. 11 shows a circuit diagram indicating an example of conventional strobe circuits.

As shown in FIG. 11, the conventional strobe circuit comprises boosting-up circuit 101 for boosting up a source voltage of battery BT to a predetermined voltage necessary for the light-emitting action of strobe-lighting tube Xe, strobe-lighting circuit 102 for charging main-capacitor MC with the high voltage generated by boosting-up circuit 101 to emit a strobe light from strobe-lighting tube Xe, and neon lamp activating circuit 103 for activating the illumination of neon lamp NE, either when charging operation for main-capacitor is completed or when the user forgets to turn off a strobe-switch operating section (not shown in the drawings), mounted in the lens-fitted film unit, so as to warn the user.

Battery BT is coupled to boosting-up circuit 101 through switch SW1 (a power switch), which is one of main switch MSW, serving as a double-pole single-throw switch, to be turned on or off by the operating action for the strobe-switch operating section.

The boosting-up circuit 101 comprises oscillation transistor Q, oscillation transformer TR1 and resistor R1.

Oscillation transformer TR1 is composed of primary winding W1 and secondary winding W2 for boosting up the voltage of battery BT. Oscillation transistor Q and oscillation transformer TR1 constitutes a self-running blocking oscillator, which starts oscillating action by turning on main switch MSW and continues its oscillation under the direct current fed from battery BT, so that an alternate current flowing through primary winding W1 induces an alternate high-voltage, corresponding to the winding number ratio of primary winding W1 and secondary winding W2, at both terminals of secondary winding W2.

Secondary winding W2 of oscillation transformer TR1 is coupled to main-capacitor MC (for instance, an electrolytic capacitor) and trigger-capacitor TC, included in strobe-lighting circuit 102, through rectifying diode D, so that the rectifying diode D rectifies alternate high-voltage induced in secondary winding W2 and the rectified current flows into main-capacitor MC and trigger-capacitor TC to charge them.

Strobe-lighting circuit 102 comprises main-capacitor MC, strobe-lighting tube Xe, trigger-switch TSW, which turns on and off in conjunction with movements of shutter blinds, trigger-coil TR2 composed of primary winding W11 and secondary winding W12, resistor R2, trigger-capacitor TC, neon lamp NE, which emits a light when the charge voltage of main-capacitor MC reaches a predetermined voltage, and resistor R4 serially connected to neon lamp NE.

Cathode K and anode A of strobe-lighting tube Xe are coupled to negative pole (−) and positive pole (+) of main-capacitor MC, respectively, and gate G is coupled to secondary winding W12 of trigger-coil TR2.

Further, the strobe circuit comprises oscillation stoppage circuit 104 for stopping unnecessary oscillating action of transistor Q when main-capacitor MC is completely charged and for stopping the power supply to boosting-up circuit 101 from battery BT.

Oscillation stoppage circuit 104 comprises oscillation-suppressing transistor Q11, resistor R11, and zener diode ZD.

The emitter and the collector of oscillation-suppressing transistor Q11 are coupled to the base of oscillation transistor Q and switch SW2 of main switch MSW, respectively, while the high-voltage generated by boosting-up circuit 101 is applied to the base of oscillation-suppressing transistor Q11 through zener diode ZD and resistor R11.

The operations of the abovementioned strobe circuit, mainly the operations of oscillation stoppage circuit 104, will be described as follow.

When turning on switch SW1 and switch SW2 by operating main switch MSW, oscillation transistor Q starts to oscillate, and the high-voltage, boosted by boosting-up circuit 101, charges main-capacitor MC.

At the same time, the high-voltage, boosted by boosting-up circuit 101, is applied to zener diode ZD.

When the charged voltage of main-capacitor MC exceeds the zener voltage of zener diode ZD, zener diode ZD turns on, resulting in a conductive state of oscillation-suppressing transistor Q11. Then, oscillation transistor Q turns off, since the conductive state of oscillation-suppressing transistor Q11 lowers the base potential of oscillation transistor Q, the base of which is coupled to the emitter of oscillation-suppressing transistor Q11.

As a result, the oscillating action of oscillation transistor Q is automatically stopped, and the power supply, fed from battery BT to boosting-up circuit 101, is also cut off to stop the unnecessary charge current flowing into main-capacitor MC. The conventional technology mentioned above is also set forth in Tokkaihei 11-183975.

According to the strobe circuit having conventional oscillation stoppage circuit 104 mentioned above, it is possible to automatically stop the oscillating action of oscillation transistor Q, to prevent excessive charging operation to main-capacitor MC and to prevent unnecessary power dissipation of battery BT when the user forgets to turn off main switch MSW.

In the conventional strobe circuit mentioned above, however, since many parts, including relatively expensive parts such as oscillation-suppressing transistor Q11 and zener diode, are employed for oscillation stoppage circuit 104, there have been problems that man-hours for assembling the lens-fitted film unit and its cost tend to increase.

SUMMARY OF THE INVENTION

To overcome the abovementioned drawbacks in conventional strobe circuits, it is an object of the present invention to provide a strobe circuit, which makes it possible to conduct a timer operation (automatic stopping operation after a predetermined time) and/or an intermittent oscillating operation by adding a small number of parts, and which is suitably employed for lens-fitted film units.

Further, it is another object of the present invention to provide a strobe circuit, which makes it possible to restrict an increase of man-hours for assembling it and to prevent a power dissipation of the power source when the user forgets to turn off the main switch.

Accordingly, to overcome the cited shortcomings, the abovementioned objects of the present invention can be attained by a lens-fitted film unit, a strobe circuit and an oscillation circuit, described as follow.

(1) A lens-fitted film unit incorporating a strobe device, comprising: a main body; a photographic film loaded in advance in the main body; a shutter; a photographic lens; and a strobe circuit included in the strobe device, the strobe circuit comprising, a boosting-up circuit including a DC power source, an oscillation transistor, an oscillation transformer having a primary winding and a secondary winding, and a rectifying element for rectifying an electronic current induced at the secondary winding of the oscillation transformer, an oscillation controlling circuit for controlling a base potential of the oscillation transistor, and a strobe lighting circuit including a main-capacitor charged by the electronic current rectified by the rectifying element, and a strobe-lighting tube driven by an electronic charge charged in the main-capacitor, wherein a collector and an emitter of the oscillation transistor are serially coupled between the DC power source and the primary winding of the oscillation transformer, and a base of the oscillation transistor is connected to one end of the secondary winding of the oscillation transformer so as to apply a voltage, induced at the secondary winding, to the base, and the oscillation controlling circuit is coupled between the DC power source and the base of the oscillation transistor.

(2) The lens-fitted film unit of item 1, wherein the oscillation controlling circuit includes a serial connection of a capacitor and a resistor.

(3) The lens-fitted film unit of item 2, wherein a capacitance value of the capacitor is in a range of 1000 pF–100 $\mu$F.

(4) The lens-fitted film unit of item 2, wherein a resistance value of the resistor is in a range of 1 K$\Omega$–10 M$\Omega$.

(5) The lens-fitted film unit of item 1, wherein the oscillation controlling circuit includes a serial connection of a second resistor and a parallel connection of a capacitor and a first resistor.

(6) The lens-fitted film unit of item 5, wherein a capacitance value of the capacitor is in a range of 100 pF–47 $\mu$F.

(7) The lens-fitted film unit of item 5, wherein a resistance value of the first resistor is in a range of 100 K$\Omega$–4.7 M$\Omega$.

(8) The lens-fitted film unit of item 5, wherein a resistance value of the first resistor is in a range of 10 K$\Omega$–100 K$\Omega$.

(9) The lens-fitted film unit of item 1, wherein the oscillation transformer further having a tertiary winding, and the oscillation controlling circuit includes a serial connection of the tertiary winding and a parallel connection of a capacitor and a resistor.

(10) The lens-fitted film unit of item 1, further comprising: a charge indication element to indicate a charging state in the main-capacitor.

(11) The lens-fitted film unit of item 10, wherein the charge indication element is either a light emitting diode or a neon lamp.

(12) The lens-fitted film unit of item 1, wherein a value of the base potential for activating the oscillation transistor is higher than that for deactivating the oscillation transistor.

(13) A strobe circuit, comprising: a boosting-up circuit, which includes, a DC power source, an oscillation transistor, an oscillation transformer having a primary winding and a secondary winding, and a rectifying element for rectifying an electronic current induced at the secondary winding of the oscillation transformer; an oscillation controlling circuit for controlling a base potential of the oscillation transistor; and a strobe lighting circuit, which includes, a main-capacitor charged by the electronic current rectified by the rectifying element, and a strobe-lighting tube driven by an electronic charge charged in the main-capacitor, wherein a collector and an emitter of the oscillation transistor are serially coupled between the DC power source and the primary winding of the oscillation transformer, and a base of the oscillation transistor is connected to one end of the secondary winding of the oscillation transformer so as to apply a voltage, induced at the secondary winding, to the base, and the oscillation controlling circuit is coupled between the DC power source and the base of the oscillation transistor.

(14) The strobe circuit of item 13, wherein the oscillation controlling circuit includes a serial connection of a capacitor and a resistor.

(15) The strobe circuit of item 13, wherein the oscillation controlling circuit includes a serial connection of a second resistor and a parallel connection of a capacitor and a first resistor.

(16) The strobe circuit of item 13, wherein the oscillation transformer further having a tertiary winding, and the oscillation controlling circuit includes a serial connection of the tertiary winding and a parallel connection of a capacitor and a resistor.

(17) The strobe circuit of item 13, wherein a value of the base potential for activating the oscillation transistor is higher than that for deactivating the oscillation transistor.

(18) An oscillation circuit, comprising: a DC power source; an oscillation transistor; an oscillation transformer having a primary winding and a secondary winding; and an oscillation controlling circuit for controlling a base potential of the oscillation transistor; wherein a collector and an emitter of the oscillation transistor are serially coupled between the DC power source and the primary winding of the oscillation transformer, and a base of the oscillation transistor is connected to one end of the secondary winding of the oscillation transformer so as to apply a voltage, induced at the secondary winding, to the base, and the oscillation controlling circuit is coupled between the DC power source and the base of the oscillation transistor.

Further, to overcome the abovementioned problems, other oscillation circuits and strobe circuits, embodied in the present invention, will be described as follow:

(19) An oscillation circuit, characterized in that, in the oscillation circuit comprising an oscillation transistor, a collector and an emitter of which are serially coupled to a DC power supply and a primary winding of a oscillation transformer, and a base of which is driven by a voltage induced at the secondary winding of the oscillation transformer, an oscillation controlling circuit for controlling a base potential of the oscillation transistor is coupled.

(20) The oscillation circuit of item 19, characterized in that the oscillation controlling circuit is composed of a serial connection of a capacitor and a resistor.

(21) The oscillation circuit of item 19, characterized in that the oscillation controlling circuit is composed of a serial connection of a resistor and a parallel connection of a capacitor and a resistor.

According to the present invention, described in items 19–21, in a simple configuration added with the oscillation controlling circuit including a capacitor and a resistor, or a capacitor and two resistors, it becomes possible to provide an oscillation circuit, which makes it possible to conduct a timer operation for automatically stopping the oscillation circuit after a predetermined time has elapsed, and/or an intermittent oscillating operation, and which is suitably employed for lens-fitted film units incorporating strobe devices.

(22) A strobe circuit, characterized in that the strobe circuit comprises a oscillation circuit which includes a DC power supply and an oscillation transistor, a collector and an emitter of which are serially coupled to a DC power supply and a primary winding of a oscillation transformer, and a base of which is driven by a voltage induced at the secondary winding of the oscillation transformer, and which also includes a rectifying element, connected to the secondary winding of the oscillation transformer, for rectifying a boosted voltage boosted by the oscillation transformer, an oscillation controlling circuit, coupled between the DC power supply and the base of the oscillation transistor, for controlling a base potential of the oscillation transistor, and a strobe lighting circuit, which includes a main-capacitor charged by a voltage rectified by the rectifying element and a strobe-lighting tube driven by a charged voltage stored in the main-capacitor.

(23) The strobe circuit of item 22, characterized in that the oscillation controlling circuit is composed of a serial connection of a capacitor and a resistor.

(24) The strobe circuit of item 22, characterized in that the oscillation controlling circuit is composed of a serial connection of a resistor and a parallel connection of a capacitor and a resistor.

(25) The strobe circuit of item 22, characterized in that the oscillation controlling circuit is composed of a serial connection of a tertiary winding of the oscillation transformer and a parallel connection of a capacitor and a resistor.

(26) The strobe circuit, described in one of items 22–25 characterized in that the strobe circuit comprises a charge-notifying element for notifying the user of charging state of the main-capacitor.

(27) The strobe circuit of item 26, characterized in that, in the strobe circuit described in one of items 22–25, the charge-notifying element is selected out of either light emitting diodes or neon lamps.

According to the present invention, described in items 22–27, it is possible to reliably stop the oscillating action of the oscillation transistor by controlling the base potential of the oscillation transistor of the boosting-up circuit, under the operation of the oscillation controlling circuit composed of a combination of the capacitor, the resistor and the tertiary winding of the oscillation transformer, which are coupled between the DC power source and the base of the oscillation transistor. In addition, it is also possible to reduce the number of parts employed, resulting in the cost-reduction and the reduction of man-hours for assembling, and to surely prevent a power dissipation of the battery.

(28) The oscillation circuit, described in one of items 19–21, characterized in that a value of the base potential for activating the oscillation transistor is higher than that for deactivating the oscillation transistor.

(29) The oscillation circuit, described in one of items 22–26, characterized in that a value of the base potential for activating the oscillation transistor is higher than that for deactivating the oscillation transistor.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

The strobe circuit, embodied in the present invention, comprises a boosting-up circuit, an oscillation controlling circuit for controlling a base voltage of an oscillation transistor and a strobe lighting circuit. Further, the boosting-up circuit comprises a DC power source, an oscillation transistor, an oscillation transformer having a primary winding and a secondary winding, and a rectifying element for rectifying boosted current flowing in the oscillation transformer. Further, the strobe lighting circuit comprises a main-capacitor to be charged by a voltage rectified by the rectifying element, and a strobe-lighting tube to be driven by a voltage charged in the main-capacitor.

The DC power source and the primary winding of the oscillation transformer are serially connected between the collector and the base of the oscillation transistor, and a voltage induced at the secondary winding is applied to the base of the oscillation transistor. Further, the oscillation controlling circuit is coupled between the DC power source and the base of the oscillation transistor.

Incidentally, it is desirable that the oscillation controlling circuit comprises a serial connection of a capacitor and a resistor, and more desirable that the oscillation controlling circuit is composed of a serial connection of a capacitor and a resistor.

Further, it is also desirable that the oscillation controlling circuit comprises a serial connection of a second resistor and a parallel connection of a capacitor and a first resistor, and more desirable that the oscillation controlling circuit is composed of a serial connection of a second resistor and a parallel connection of a capacitor and a first resistor.

Further, it is also desirable that the oscillation transformer has a tertiary winding, and the oscillation controlling circuit comprises a serial connection of the tertiary winding and a parallel connection of a capacitor and a resistor, and more desirable that the oscillation controlling circuit is composed of a serial connection of the tertiary winding and a parallel connection of a capacitor and a resistor.

Embodiments of the present invention will be detailed in the following, referring to the drawings.

[The First Embodiment]

An oscillation circuit, embodied in the present invention, comprises a DC voltage source, an oscillation transistor, an oscillation transformer having a primary winding and a secondary winding, and an oscillation controlling circuit. It is desirable that the oscillation circuit further comprises a rectifying element for rectifying an electronic current boosted by the oscillation transformer.

The oscillation circuit of the first embodiment of the present invention, will be detailed in the following, referring to FIG. 1 through FIG. 4.

Figure 1:
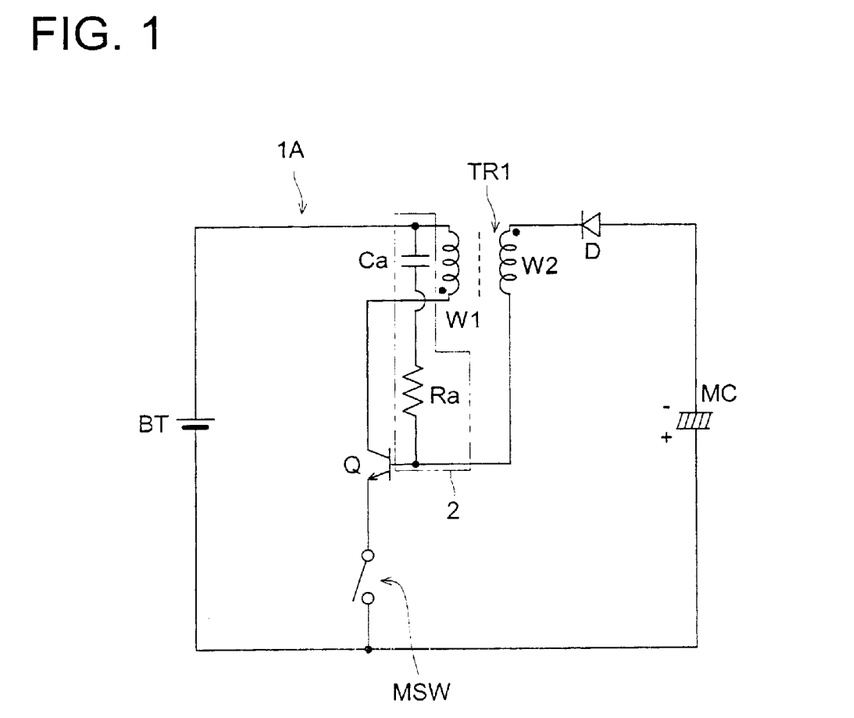
FIG. 1 shows a circuit diagram indicating an oscillation circuit of the first embodiment of the present invention.

Oscillation circuit 1A shown in FIG. 1 comprises battery BT serving as the DC voltage source, oscillation transistor Q, to the base of which a voltage induced at secondary winding W2 of oscillation transformer TR1 is applied, and main switch MSW serving as a power switch. The battery BT and primary winding W1 of oscillation transformer TR1 are serially connected between the collector and the base of oscillation transistor Q.

Oscillation controlling circuit 2, which is a serial connection of capacitor Ca and resistor Ra to control the base potential of oscillation transistor Q, is coupled between the positive electrode of battery BT and the base of oscillation transistor Q.

One terminal (marked by symbol •) of secondary winding W2 of oscillation transformer TR1 is connected to the cathode of rectifying diode D, while another terminal of secondary winding W2 is connected to the base of oscillation transistor Q.

Main-capacitor MC (electrolytic capacitor) is coupled as a load between the anode of rectifying diode D and the negative electrode of battery BT.

In the configuration of oscillation circuit 1A, when turning on main switch MSW at time T1 to apply the power voltage between the collector and the emitter of oscillation transistor Q through main switch MSW and primary winding W1, oscillation transistor Q is activated by a predetermined alternate voltage induced at secondary winding W2 of oscillation transformer TR1 and starts oscillating.

At this time, in the serial connection of capacitor Ca and resistor Ra, the voltage between both terminals of capacitor Ca increases as the electronic charges are gradually accumulated in capacitor Ca.

It is desirable that the capacitance value of capacitor Ca is selected in a range of 1000 pF–100 $\mu$F and the resistance value of resistor Ra is selected in a range of 1 K$\Omega$–10 M$\Omega$ such that oscillation is continued for a period of time necessary for a charging voltage of the main capacitor MC to reach a voltage necessary for an actual operation and the oscillation is not continued for a un-necessary long period of time.

Figure 2:
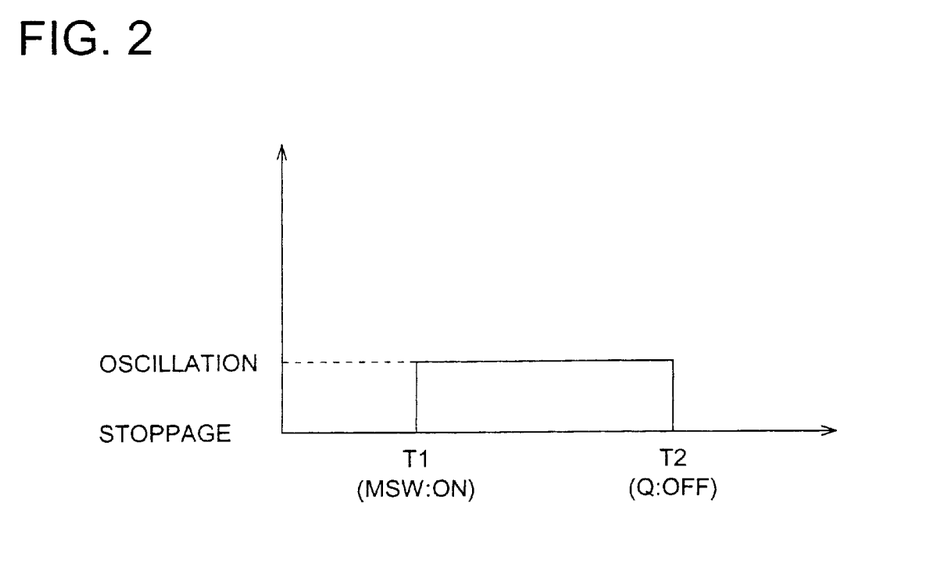
FIG. 2 shows an explanatory schematic of an oscillating operation in the oscillation circuit of the first embodiment.

As a result, the base potential of oscillation transistor Q gradually decreases to the cut-off potential of oscillation transistor Q. When the base potential reaches the cut-off potential at time T2, oscillation transistor Q is automatically deactivated and oscillation circuit 1A stops its oscillating action.

In other words, the oscillation controlling circuit described above performs such a controlling action that the base potential of the oscillation transistor gradually decreases after the oscillation starts. Incidentally, it is also applicable that the oscillation controlling circuit performs such a controlling action that the base potential of the oscillation transistor drastically decreases after the oscillation starts.

According to oscillation circuit 1A, it is possible to perform a timer operation for automatically stopping the oscillating action of oscillation circuit 1A, when a predetermined time period (from time T1 to time T2) has elapsed after the oscillation starts, with a very simple configuration including only capacitor Ca and resistor Ra. Such the simple configuration is very suitable for the lens-fitted film unit incorporating the strobe device detailed later. Incidentally, it is desirable that the predetermined time period mentioned above is longer than the time necessary for completing the charging operation of the main-capacitor.

Figure 3:
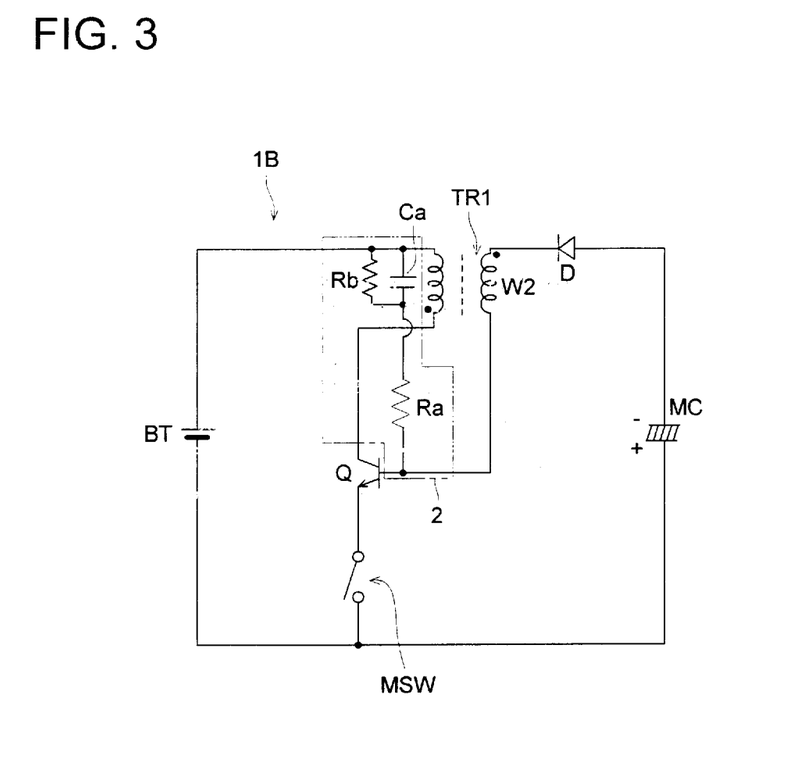
FIG. 3 shows a circuit diagram indicating another oscillation circuit of the first embodiment of the present invention.

FIG. 3 shows a circuit diagram of oscillation circuit 1B, which is another example of the first embodiment. Oscillation controlling circuit 2 of oscillation circuit 1B further comprises resistor Rb coupled in parallel to capacitor Ca, in addition to the configuration of oscillation circuit 1A.

Figure 4:
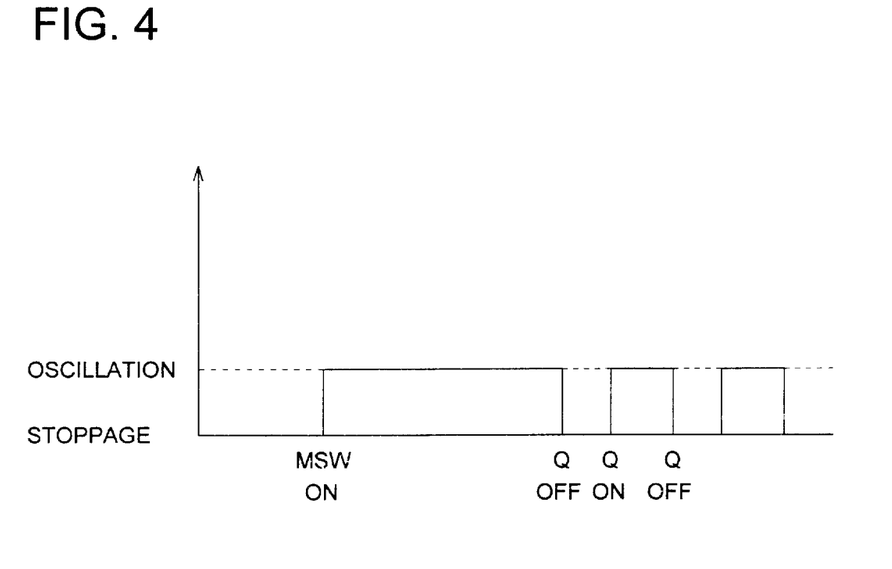
FIG. 4 shows an explanatory schematic of an oscillating operation in the oscillation circuit shown in FIG. 3.

According to oscillation circuit 1B, after oscillation transistor Q is deactivated when the base potential decreases below the cut-off potential, since the electronic charges stored in capacitor Ca are gradually discharged through resistor Rb, oscillation transistor Q resumes oscillation when the base potential exceeds the set-on potential. Since the set-on potential, at which oscillation transistor Q starts oscillation, is higher than the cut-off potential in the hysteresis characteristics of oscillation transistor Q, it becomes possible to provide oscillation circuit 1B, which exhibits the intermittent oscillating action as shown in FIG. 4. Such intermittent oscillating action is very suitable for the lens-fitted film unit incorporating the strobe device detailed later.

In other words, the oscillation controlling circuit described above alternately repeats such a controlling action that the base potential of the oscillation transistor gradually decreases during the oscillation after the oscillation starts, and thereafter, gradually increases when the oscillation is stopped. It is also applicable that the oscillation controlling circuit alternately repeats such a controlling action that the base potential of the oscillation transistor drastically decreases after the oscillation starts, and thereafter, drastically increases.

As same with the previous embodiment, to disable the continuous oscillation of oscillation transistor Q, it is desirable that the resistance value of resistor Rb is set at a value in the range of 100 K$\Omega$–4.7 M$\Omega$.

[The Second Embodiment]

As the second embodiment, the strobe circuit incorporated in the lens-fitted film unit will be detailed in the following, referring to FIG. 5 through FIG. 7.

The lens-fitted film unit, embodied in the present invention, comprises a main body, a photographic film loaded in advance in the main body, a shutter, a photographic lens, and a strobe unit comprising a strobe circuit. Further, it is desirable that the strobe unit comprises a reflector, disposed behind the strobe-lighting tube, for reflecting strobe light, and a strobe panel for transmitting the strobe light. Sometimes, the combination of the strobe-lighting tube, the reflector and the strobe panel is cited as a strobe lighting section.

Figure 6:
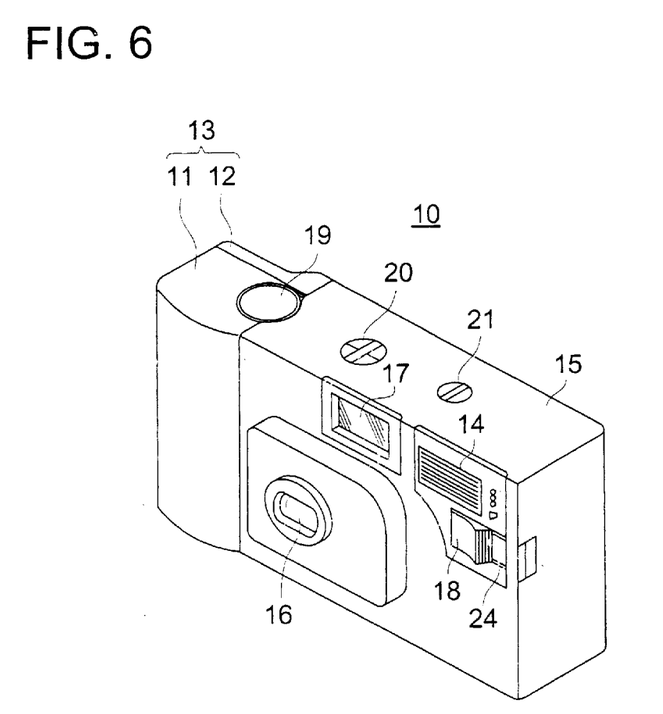
FIG. 6 shows a perspective view of the lens-fitted film unit of the second embodiment.
Figure 7:
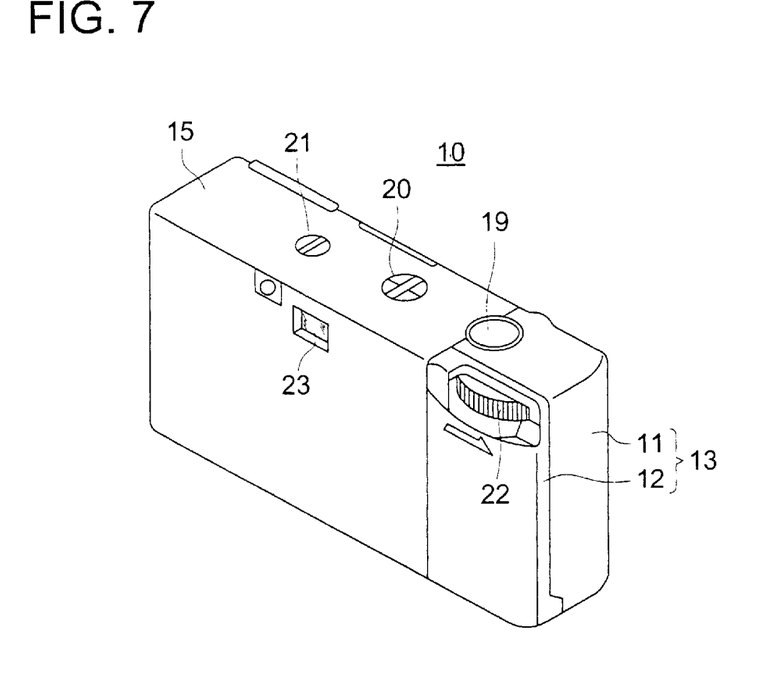
FIG. 7 shows a perspective view of the lens-fitted film unit of the second embodiment, viewing from the rear side.

In lens-fitted film unit 10 of the second embodiment shown in FIG. 6 and FIG. 7, main body 13 is constructed by enclosing the main section (not shown in the drawings), which includes primary structural parts, with front cover 11 and rear cover 12, both made of a synthetic resin material. Strobe lighting section 14 is mounted stationary at the right end of the front surface of main body 13 in which a non-exposed roll film is loaded in advance. Paper cover 15 further encloses the main section of main body 13, which has no rear opening section for detaching the film and is constructed in a tightly closed structure, so that front cover 11 and rear cover 12 cannot be disassembled without specific disassembling tools. Strobe lighting section 14, photographic lens 16, finder window 17 and strobe activating switch 18 are arranged on the front surface of main body 13, while shutter release button 19, film counter window 20 and charge confirmation window 21 are arranged on the upper surface of main body 13.

Further, as shown in FIG. 7, film-winding knob 22 and finder eyepiece 23 are equipped at the rear surface of main body 13, and battery BT for the strobe lighting, such as a dry cell, etc., is accommodated in a battery room (not shown in the drawings) located at an inner bottom section of main body 13.

Strobe activating switch 18 can be slid in a longitudinal direction of main body 13 along guiding groove 24 located below strobe lighting section 14. When strobe activating switch 18 is positioned at such a position that a part of strobe activating switch 18 protrudes from one side of main body 13, main switch MSW, equipped on strobe circuit 30 in main body 13, turns ON to start the strobe charging operation. While, when strobe activating switch 18 is positioned at such a position that its inner end contacts the inner wall of guiding groove 24, main switch MSW turns OFF to stop the strobe charging operation.

Neon lamp NE, serving as a charge-notifying element of strobe circuit 30 mounted in main body 13, is disposed inside charge confirmation window 21 to notify the user of the completion of the strobe charging operation for main-capacitor MC.

Strobe-lighting tube Xe (xenon tube) is accommodated in strobe lighting section 14. The illuminating operations for strobe-lighting tube Xe and neon lamp NE is conducted by strobe circuit 30 mounted in main body 13.

The strobe circuit comprises a boosting-up circuit, an oscillation controlling circuit for controlling a base potential of an oscillation transistor, and a strobe lighting circuit. The boosting-up circuit comprises a DC power source, an oscillation transistor, an oscillation transformer having a primary winding and a secondary winding, and a rectifying element for rectifying an electronic current boosted by the oscillation transformer. The strobe-lighting circuit comprises a main-capacitor to be charged by a voltage rectified by the rectifying element, and a strobe-lighting tube to be driven by a voltage charged in the main-capacitor.

Figure 5:
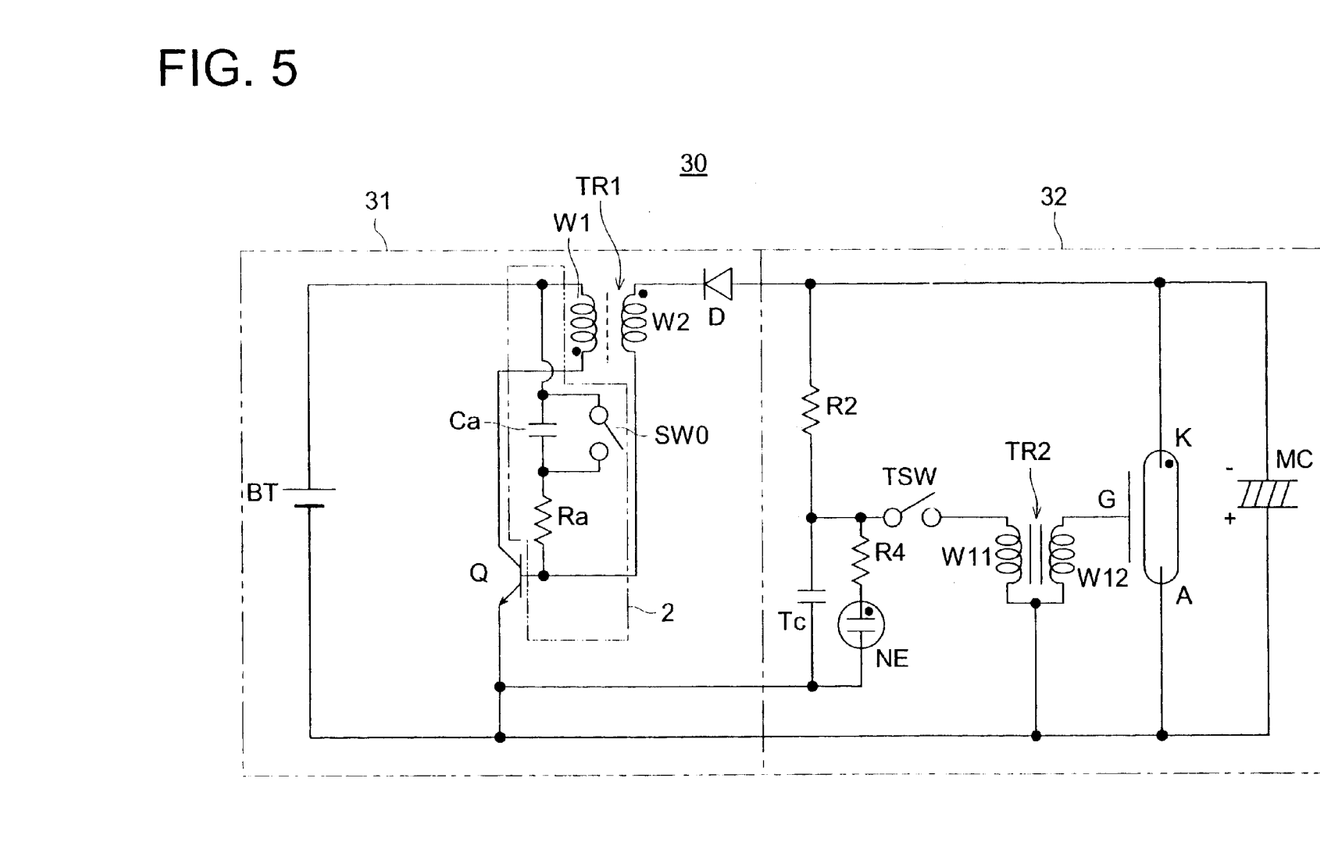
FIG. 5 shows a circuit diagram indicating a strobe circuit of the second embodiment, incorporated in a lens-fitted film unit, embodied in the present invention.

Strobe circuit 30 of the second embodiment, shown in FIG. 5, comprises boosting-up circuit 31 for boosting up the voltage of battery BT to a predetermined high voltage necessary for illuminating strobe-lighting tube Xe, and strobe lighting circuit 32.

In boosting-up circuit 31, oscillation controlling circuit 2, structured in the serial connection of capacitor CP and resistor Ra to control the base potential of oscillation transistor Q, is coupled between the positive electrode of battery BT and the base of oscillation transistor Q, as well as oscillation circuit 1A shown in FIG. 1. Further, discharging switch SW0, being a constant open type, is coupled in parallel to capacitor Ca.

Since the configuration of strobe-lighting circuit 32 is the same as that of strobe-lighting circuit 102 shown in FIG. 11, the same reference marks are attached and the detailed descriptions are omitted.

According to strobe circuit 30 of the second embodiment, it is possible to perform a timer operation for automatically stopping the oscillating action of oscillation transistor Q in boosting-up circuit 31, when a predetermined time period (from time T1 to time T2) has elapsed after the oscillation starts, with a very simple configuration including only capacitor Ca and resistor Ra, under the same operation as that in oscillation circuit 1A shown in FIG. 1. It is also possible to prevent an unnecessary power dissipation of battery BT by automatically stopping the oscillating action in boosting-up circuit 31.

In other words, the oscillation controlling circuit described above performs such a controlling action that the base potential of the oscillation transistor gradually decreases after the oscillation starts. Incidentally, it is also applicable that the oscillation controlling circuit performs such a controlling action that the base potential of the oscillation transistor drastically decreases after the oscillation starts. Further, it is desirable that the predetermined time period mentioned above is longer than the time necessary for completing the charging operation of the main-capacitor.

Further, in boosting-up circuit 31, it is also possible to restart the oscillating action of oscillation transistor Q, by instantaneously turning ON discharging switch SW0, being a constant open type, to compulsively discharge electronic charges stored in capacitor Ca and thereby increasing the base potential of oscillation transistor Q.

For instance, the abovementioned embodiment can be applied for the lens-fitted film unit in such a type that the strobe charging operation is conducted by pushing a strobe switch, being a push button type and equipped on the lens-fitted film unit, every time when capturing an image with the strobe lighting. In the above configuration, discharging switch SW0 turns ON interlocking with the pushing movement of the strobe switch. The oscillation restating operation, mentioned above, allows the user to capture again an image with the strobe lighting after once capturing an image with the strobe lighting.

[The Third Embodiment]

Figure 8:
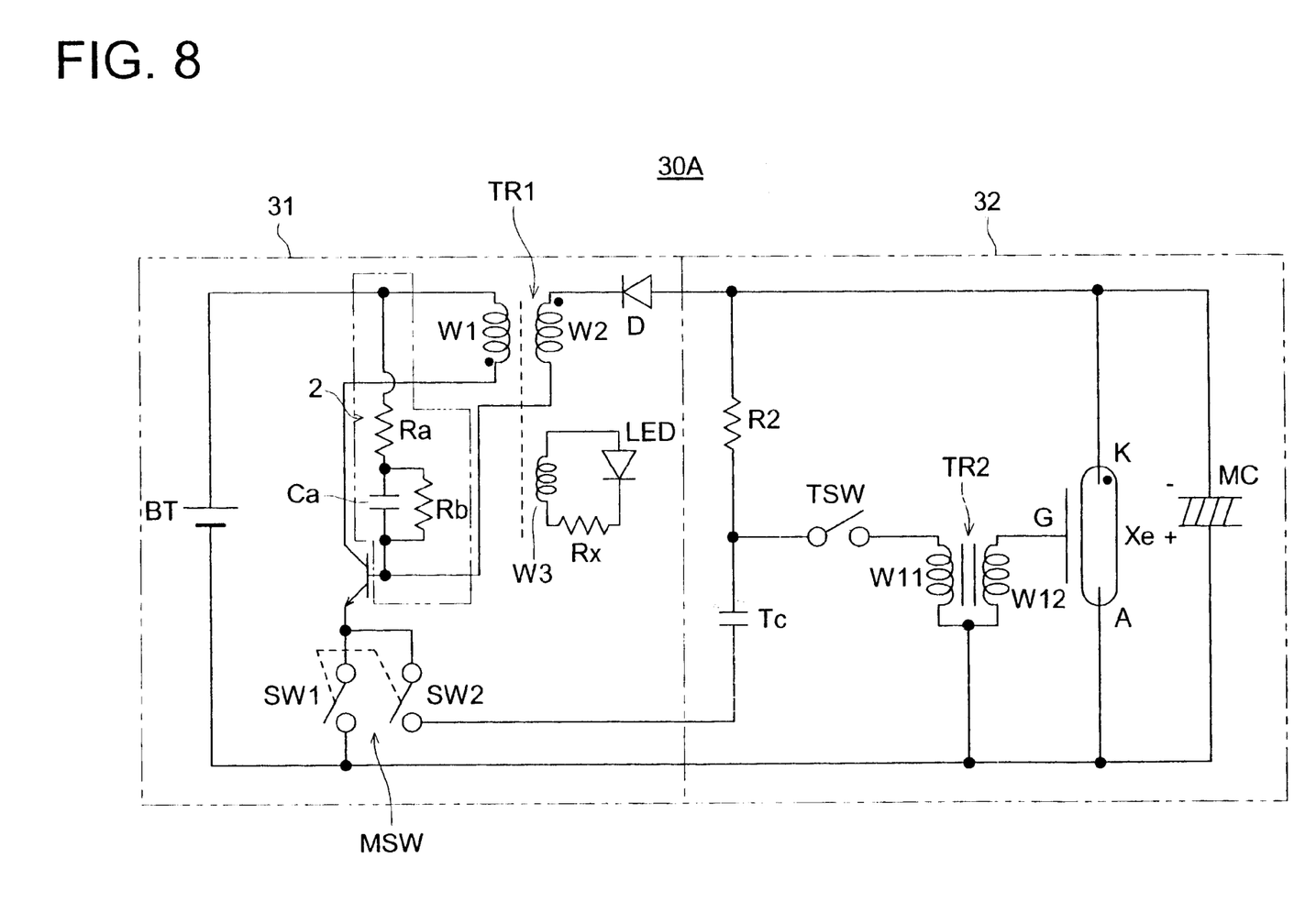
FIG. 8 shows a circuit diagram indicating a strobe circuit of the third embodiment, incorporated in a lens-fitted film unit, embodied in the present invention.

In the configuration of strobe circuit 30A of the third embodiment shown in FIG. 8, a double-pole single-throw switch is employed as main switch MSW, as well as the conventional example; oscillation controlling circuit 2, structured as the serial connection of resistor Ra and the parallel connection of capacitor Ca and resistor Rb, is coupled; neon lamp NE is omitted; and light emitting diode LED, serving as a charge-notifying element, is driven by an electronic current induced in tertiary winding W3, equipped in oscillation transformer TR, through resistor Rx. Other parts of the configuration are the same as those of strobe circuit 30 of the second embodiment.

According to strobe circuit 30A, it is possible to conduct an intermittent oscillating operation, in which the oscillation of oscillation transistor Q automatically turns OFF under the same operation as that in oscillation circuit 1B shown in FIG. 3, and then, the oscillation is restated by gradually discharging the electronic charges stored in capacitor Ca through resistor Rb and thereby increasing the base potential of oscillation transistor Q.

The intermittent oscillating operation, mentioned above, allows preventing the power dissipation of the battery when the user forgets to turn off the main-switch. In addition, since the recharging operation is automatically commenced if the main switch is still turned ON, it is desirably easy to continuously capture images with the strobe lighting even after once capturing an image with strobe lighting.

In other words, the oscillation controlling circuit described above alternately repeats such a controlling action that the base potential of the oscillation transistor gradually decreases after the oscillation starts, and thereafter, gradually increases. It is also applicable that the oscillation controlling circuit alternately repeats such a controlling action that the base potential of the oscillation transistor drastically decreases after the oscillation starts, and thereafter, drastically increases.

Incidentally, it is desirable that a 1.5 V alkaline dry cell is employed for battery BT, and the capacitance value of main-capacitor MC, the capacitance value of capacitor Ca, the resistance value of resistor Ra and the resistance value of resistor Rb are selected in ranges of 70 $\mu$F–120 $\mu$F, 1000 pF–47 $\mu$F, 10 K$\Omega$–100 K$\Omega$ and 100 K$\Omega$–4.7 M$\Omega$, respectively.

[The Fourth Embodiment]

Figure 9:
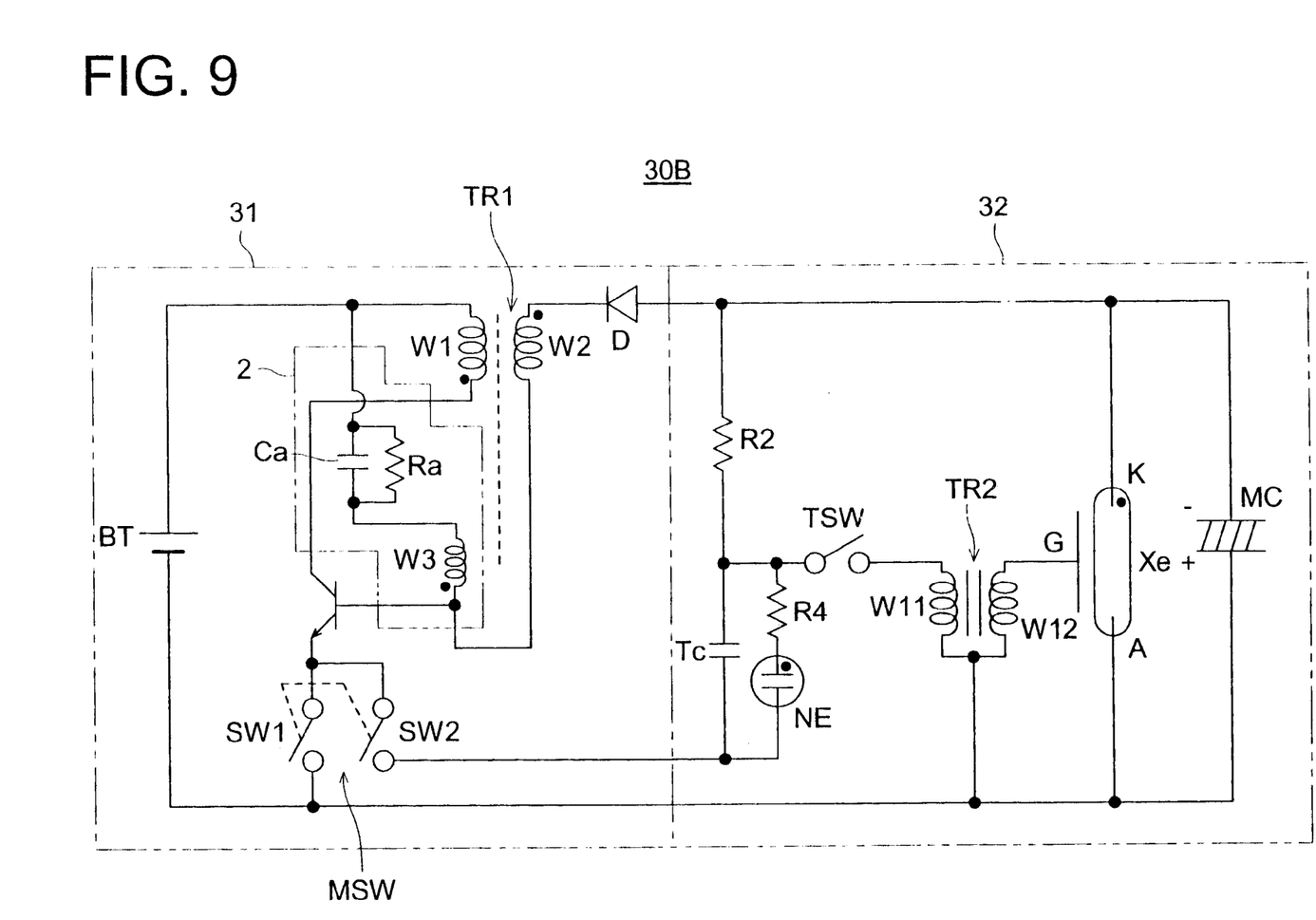
FIG. 9 shows a circuit diagram indicating a strobe circuit of the fourth embodiment, incorporated in a lens-fitted film unit, embodied in the present invention.

In the configuration of strobe circuit 30B of the fourth embodiment shown in FIG. 9, a double-pole single-throw switch is employed as main switch MSW, as well as the conventional example, and oscillation controlling circuit 2, structured as the serial connection of tertiary winding W3, equipped in oscillation transformer TR1, and the parallel connection of capacitor Ca and resistor Rb, is employed. Other parts of the configuration are the same as those of strobe circuit 30 of the second embodiment.

According to strobe circuit 30B, it is also possible to conduct an intermittent oscillating operation, in which the oscillation of oscillation transistor Q automatically turns OFF under the same operation as that in oscillation circuit 1B shown in FIG. 3, and then, the oscillation is restated by gradually discharging the electronic charges stored in capacitor Ca through resistor Ra and tertiary winding W3, and thereby, increasing the base potential of oscillation transistor Q.

The intermittent oscillating operation, mentioned above, allows preventing the power dissipation of the battery when the user forgets to turn off the main-switch. In addition, since the recharging operation is automatically commenced if the main switch is still turned ON, it is desirably easy to continuously capture images with the strobe lighting even after once capturing an image with strobe lighting.

In other words, the oscillation controlling circuit described above alternately repeats such a controlling action that the base potential of the oscillation transistor gradually decreases after the oscillation starts, and thereafter, gradually increases. It is also applicable that the oscillation controlling circuit alternately repeats such a controlling action that the base potential of the oscillation transistor drastically decreases after the oscillation starts, and thereafter, drastically increases.

[The Fifth Embodiment]

Figure 10:
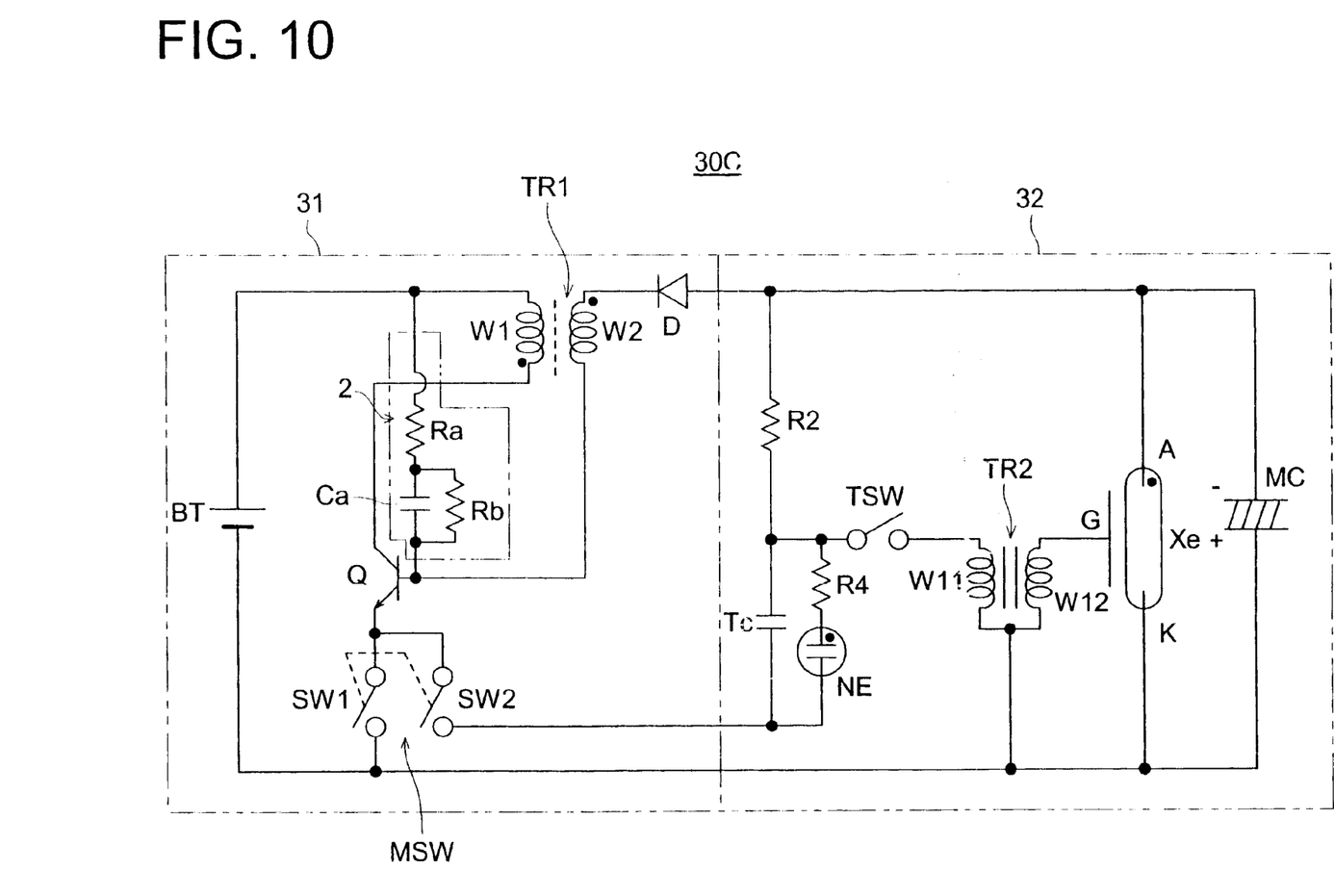
FIG. 10 shows a circuit diagram indicating a strobe circuit of the fifth embodiment, incorporated in a lens-fitted film unit, embodied in the present invention.

In the configuration of strobe circuit 30C of the fifth embodiment shown in FIG. 10, a double-pole single-throw switch is employed as main switch MSW, as well as for the conventional example; oscillation controlling circuit 2, structured as the serial connection of resistor Ra and the parallel connection of capacitor Ca and resistor Rb, is employed; a PNP type transistor is employed for oscillation transistor Q; and the polarities of battery BT and main-capacitor MC are reversed so as to comply with the PNP type transistor. Other parts of the configuration are the same as those of strobe circuit 30 of the second embodiment.

According to strobe circuit 30C, it is also possible to conduct an intermittent oscillating operation, in which the oscillation of oscillation transistor Q automatically turns OFF under the same operation as that in oscillation circuit 1B shown in FIG. 3, and then, the oscillation is restated by gradually discharging the electronic charges stored in capacitor Ca through resistor Rb and thereby increasing the base potential of oscillation transistor Q.

The intermittent oscillating operation, mentioned above, allows preventing the power dissipation of the battery when the user forgets to turn off the main-switch. In addition, since the recharging operation is automatically commenced if the main switch is still turned ON, it is desirably easy to continuously capture images with the strobe lighting even after once capturing an image with strobe lighting.

In other words, the oscillation controlling circuit described above alternately repeats such a controlling action that the base potential of the oscillation transistor gradually decreases after the oscillation starts, and thereafter, gradually increases. It is also applicable that the oscillation controlling circuit alternately repeats such a controlling action that the base potential of the oscillation transistor drastically decreases after the oscillation starts, and thereafter, drastically increases.

Incidentally, the strobe device of the present invention may be used for a camera.

As mentioned above, according to the present invention, since the oscillation circuit, embodied in the present invention, makes it possible to conduct a timer operation, in which the oscillation automatically stops after the oscillation starts, and to conduct the intermittent oscillating operation in a very simple configuration only adding a small number of parts, it becomes possible to provide the oscillation circuit suitable for strobe devices incorporated in lens-fitted film units.

Further, according to the present invention, since the oscillation circuit, embodied in the present invention, makes it possible to conduct a timer operation, in which the oscillation automatically stops after the oscillation starts, in a very simple configuration only adding a small number of parts, it becomes possible to provide the strobe circuit, which prevents unnecessary power dissipations of the battery.

Still further, according to the present invention, since the oscillation circuit, embodied in the present invention, makes it possible to conduct an intermittent oscillating operation after the oscillation starts in a very simple configuration only adding a small number of parts, it becomes possible to provide the strobe circuit, which prevents unnecessary power dissipations of the power source.

Disclosed embodiment can be varied by a skilled person without departing from the spirit and scope of the invention.

What is claimed is:

1. A lens-fitted film unit incorporating a strobe device, comprising:

a main body;

a photographic film loaded in advance in said main body;

a shutter;

a photographic lens; and a strobe circuit included in said strobe device, said strobe circuit comprising, a boosting-up circuit including a DC power source, an oscillation transistor, an oscillation transformer having a primary winding and a secondary winding, and a rectifying element for rectifying an electronic current induced by said oscillation transformer, an oscillation controlling circuit, coupled between said DC power source and a base of said oscillation transistor, for controlling a base potential of said oscillation transistor so as to automatically deactivate said oscillation transistor when an oscillating action of said oscillation transistor lasts a predetermined time interval, and a strobe lighting circuit including a main capacitor charged by said electronic current rectified by said rectifying element, and a strobe-lighting tube driven by an electronic charge charged in said main-capacitor, wherein a collector and an emitter of said oscillation transistor are serially coupled between said DC power source and said primary winding of said oscillation transformer, and a base of said oscillation transistor is driven by a voltage induced at said secondary winding of said oscillation transformer.

2. The lens-fitted film unit of claim 1, wherein said oscillation controlling circuit includes a serial connection of a capacitor and a resistor.

3. The lens-fitted film unit of claim 2, wherein a capacitance value of said capacitor is in a range of 1000 pF–100 $\mu$F.

4. The lens-fitted film unit of claim 2, wherein a resistance value of said resistor is in a range of 1 K$\Omega$–10 M$\Omega$.

5. The lens-fitted film unit of claim 1, wherein said oscillation controlling circuit includes a serial connection of a second resistor and a parallel connection of a capacitor and a first resistor.

6. The lens-fitted film unit of claim 5, wherein a capacitance value of said capacitor is in a range of 100 pF–47 $\mu$F.

7. The lens-fitted film unit of claim 5, wherein a resistance value of said first resistor is in a range of 100 K$\Omega$–4.7 M$\Omega$.

8. The lens-fitted film unit of claim 5, wherein a resistance value of said second resistor is in a range of 10 K$\Omega$–100 K$\Omega$.

9. The lens-fitted film unit of claim 1, wherein said oscillation transformer further having a tertiary winding, and said oscillation controlling circuit includes a serial connection of said tertiary winding and a parallel connection of a capacitor and a resistor.

10. The lens-fitted film unit of claim 1, further comprising:
a charge indication element to indicate a charging state in said main-capacitor.

11. The lens-fitted film unit of claim 10, wherein said charge indication element is either a light emitting diode or a neon lamp.

12. The lens-fitted film unit of claim 1, wherein a value of said base potential for activating said oscillation transistor is higher than that for deactivating said oscillation transistor.

13. A strobe circuit, comprising:
a boosting-up circuit, which includes,
a DC power source,
an oscillation transistor,
an oscillation transformer having a primary winding and a secondary winding, and
a rectifying element for rectifying an electronic current induced by said oscillation transformer,
an oscillation controlling circuit, coupled between said DC power source and a base of said oscillation transistor, for controlling a base potential of said oscillation transistor so as to automatically deactivate said oscillation transistor when an oscillating action of said oscillation transistor lasts a predetermined time interval, and
a strobe lighting circuit, which includes, a main capacitor charged by said electronic current rectified by said rectifying element, and
a strobe-lighting tube driven by an electronic charge charged in said main-capacitor, wherein a collector and an emitter of said oscillation transistor are serially coupled between said DC power source and said primary winding of said oscillation transformer, and a base of said oscillation transistor is driven by a voltage induced at said secondary winding of said oscillation transformer.

14. The strobe circuit of claim 13, wherein said oscillation controlling circuit includes a serial connection of a capacitor and a resistor.

15. The strobe circuit of claim 13, wherein said oscillation controlling circuit includes a serial connection of a second resistor and a parallel connection of a capacitor and a first resistor.

16. The strobe circuit of claim 13, wherein said oscillation transformer further having a tertiary winding, and said oscillation controlling circuit includes a serial connection of said tertiary winding and a parallel connection of a capacitor and a resistor.

17. The strobe circuit of claim 13, wherein a value of said base potential for activating said oscillation transistor is higher than that for deactivating said oscillation transistor.

18. An oscillation circuit, comprising:
a DC power source,
an oscillation transistor,
an oscillation transformer having a primary winding and a secondary winding, and
an oscillation controlling circuit, coupled between said DC power source and a base of said oscillation transistor, for controlling a base potential of said oscillation transistor so as to automatically deactivate said oscillation transistor when an oscillating action of said oscillation transistor lasts a predetermined time interval, and
wherein a collector and an emitter of said oscillation transistor are serially coupled between said DC power source and said primary winding of said oscillation transformer, and a base of said oscillation transistor is driven by a voltage induced at said secondary winding of said oscillation transformer.

19. A camera incorporating a strobe device, comprising:
a shutter;
a photographic lens;
a strobe circuit included in said strobe device, said strobe circuit comprising,
a boosting-up circuit including a DC power source, an oscillation transistor, an oscillation transformer having a primary winding and a secondary winding, and a rectifying element for rectifying an electronic current induced by said oscillation transformer,
an oscillation controlling circuit, coupled between said DC power source and a base of said oscillation transistor, for controlling a base potential of said oscillation transistor so as to automatically deactivate said oscillation transistor when an oscillating action of said oscillation transistor lasts a predetermined time interval, and
a strobe lighting circuit including a main capacitor charged by said electronic current rectified by said rectifying element, and a strobe-lighting tube driven by an electronic charge charged in said main-capacitor, wherein a collector and an emitter of said oscillation transistor are serially coupled between said DC power source and said primary winding of said oscillation transformer, and a base of said oscillation transistor is driven by a voltage induced at said secondary winding of said oscillation transformer.

* * * * *